2,734,004
Patented Feb. 7, 1956

2,734,004

WATER SOLUBLE N-METHYLOL POLYPYRROLI-DONES, AND TEXTILES TREATED THEREWITH

Charles A. Robinson, Providence, R. I., assignor to Arnold, Hoffman & Co., Inc., Providence, R. I., a corporation of Rhode Island No Drawing. Application August 25, 1952,
Serial No. 306,297

12 Claims. (Cl. 117—139.5)

The present invention relates to the preparation of novel derivatives of synthetic linear polyamides, and more particularly is concerned with the provision of N-methylol derivatives of polypyrrolidone.

It is known that the solubility of polypyrrolidone is limited to only a few reagents such as mineral and organic acids and phenols. Of these, mineral acids are not particularly desirable for dissolution of polypyrrolidone because they cause degradation to lower molecular weight polyamides. Consequently, it would be advantageous to have some way of extending the solubility of polypyrrolidone, or a simple derivative thereof, to other materials, and particularly to water. Furthermore, modification of other properties of polypyrrolidone by the production of a readily prepared derivative would greatly broaden the usefulness of this new polyamide.

N-methylol derivatives of polyamides of the Nylon type have previously been described, but no claim has been made that these products were water-soluble and in fact, such water-soluble products are not known. These N-methylol derivatives of Nylon-type polyamides have been prepared by reaction of the polyamides with formaldehyde in formic acid solution, but this mode of preparation is reported to be difficult since very strict control of the reaction is required to prevent cross-linking. The following are illustrative of the reactions involved:

(1) Methylol formation:

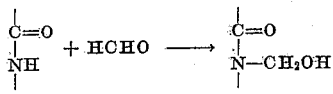

(2) Cross-linking:

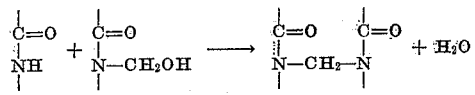

According to the present invention, it has now been found that the hitherto unknown N-methylol derivatives of polypyrrolidone can be readily prepared and that these novel derivatives, contrary to the N-methylol derivatives of the Nylon-type polyamides, possess water-solubility and other highly desirable characteristics. Consequently, the principal object of the present invention is the preparation of new and useful polymeric materials.

A further object of the invention is the conversion of polypyrrolidones into water-soluble N-methylol products.

Another object is the provision of a simple and practical method for preparing N-methylol polypyrrolidones.

Still another and more specific object of the invention is to provide impregnating or coating materials which are derived from polypyrrolidones and are suitable for application to fibrous materials, such as textiles.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the foregoing objects are accomplished, and N-methylol derivatives of polypyrrolidone prepared, by means of a process which comprises reacting polypyrrolidone with formaldehyde in the presence of monohydroxycarboxylic acid, particularly aqueous glycolic or lactic acid. By such process, it has been found that N-methylol products are readily obtainable which are free from any undesired cross-linking and are soluble in hot water.

The monohydroxycarboxylic acids serve the dual function of dissolving the polypyrrolidone and catalyzing the methylol formation, and the success of the invention is due, at least to a considerable extent, to the use of the specified acids. This is evidenced by the fact that when formic acid is used, the desired results are not obtained because of the impossibility of preventing cross-linking.

As a typical illustration of one way of carrying out the procedure of the invention, one unit mole of polypyrrolidone dissolved in 70% glycolic acid at 55–60° C. is treated with a solution of 0.75 mole of paraformaldehyde in water and the reaction is allowed to proceed at this temperature for one-half hour. After diluting with water, the cooled reaction mixture is filtered to remove traces of unreacted material and then neutralized with dilute sodium hydroxide. The product is allowed to separate, collected by filtration, washed and dried. Unlike the original polypyrrolidone, this product is soluble in hot water.

Chemically the products of the invention differ from the starting polypyrrolidone in having up to one-half or more of the available amide nitrogens substituted with methylol groups. Elemental analysis for carbon, hydrogen and nitrogen of a product obtained by the present procedures was in good agreement with the calculated values for a polypyrrolidone substituted by —CH₂OH groups on 50% of its amide nitrogens. The properties of these products appear to rule out the possibility of substitution by carboxymethoxymethyl groups from reaction of methylol groups with the glycolic acid present as represented by the following formula:

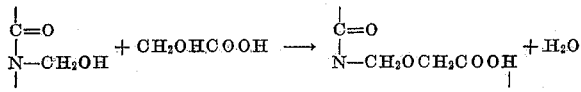

The polypyrrolidones used as starting materials in the procedures of the invention can be obtained in the manner described in application, Serial No. 260,558, now U. S. Patent 2,638,463 of May 12, 1953, the disclosure of which is made a part of this application.

Polypyrrolidones of widely varying molecular weights can be used as starting materials and by using polypyrrolidones of different molecular weights, methylol derivatives with varied properties can be obtained. Polypyrrolidones ranging in relative viscosity from 1.64 to 9.03 have been used with equal success, but it will be appreciated that polypyrrolidones possessing a relative viscosity outside the range stated above may also be treated according to the invention. Generally, the polypyrrolidones of low relative viscosity give methylol derivatives exhibiting greater water-solubility, while those of high relative viscosity are more suitable for the formation of films.

The properties of the N-methylol products depend on the degree of substitution of the amide nitrogens by methylol groups, as well as on the molecular weight of the polypyrrolidone used as a starting material. The degree of substitution appears to be dependent on the amount of formaldehyde and the other reaction conditions employed, and therefore the properties of products obtainable from a given polypyrrolidone can be varied widely. This represents an important advantage of the invention.

The amount of formaldehyde used for reaction with polypyrrolidone, in accordance with the invention, can be widely varied. Satisfactory results have been obtained using between 0.125 mole and 5 moles per unit mole of polypyrrolidone, although the most practical range is from 0.5 to 2 moles. At least 0.25 mole is required to give a product of appreciable water-solubility, while two moles results in a highly substituted product which forms a clear, viscous solution in five volumes of hot water.

As the source of formaldehyde, paraformaldehyde in aqueous solution may be used, or, in lieu thereof, formalin or any other convenient form of formaldehyde or formaldehyde-liberating substance may be employed.

Reaction of the formaldehyde with the polypyrrolidone can be carried out over a wide temperature range, although, generally speaking, 50–75° C. seem to represent the most practical temperature conditions. The time of reaction also may be widely varied, depending upon the degree of methylolation desired, but normally from fifteen minutes to an hour is sufficient. The reaction may be effected by adding the formaldehyde to a solution of the polymer which has been heated sufficiently to dissolve the polypyrrolidone and permitting the resulting reaction mixture to stand for the desired length of time, dependent upon the degree of substitution desired. Alternately, the formaldehyde may be dissolved in the monohydroxycarboxylic acid solution and the polypyrrolidone added thereto.

As the monohydroxycarboxylic acid, either glycolic or lactic acid of any conveniently obtainable concentration may be used, with glycolic acid being preferred. The acid may be used in widely varying quantities, although, preferably, for economic reasons, not much more than is necessary to dissolve the polypyrrolidone, and even less, is used. Since a decrease in the amount of water present in the reaction mixture results in a greater degree of substitution, the use of relatively highly concentrated acid is generally preferred, although an acid concentration of as low as 40% is used successfully.

After the desired methylolation has been completed, the N-methylol derivatives may be recovered from the acidic reaction mixture in any convenient way. For example, insolubles, generally constituting unreacted materials, may first be removed from the reaction mixture by filtration, after which the filtrate may be neutralized and the desired N-methylol products collected. This particular recovery procedure, however, is not critical, and any other conventional recovery method may be used.

The N-methylol derivatives of the invention can be used for a variety of purposes. Certain of the products form clear, tough films which are soluble in water. Others form heat-reversible gels which may be useful as gelatin substitutes. The products show particular promise as permanent finishes for application to textile fabrics and as coatings for glass fibers. On drying textile fabrics, impregnated with aqueous solutions of an N-methylol polypyrrolidone, the finish becomes insolubilized and is not removed by boiling in water or washing in soap solution. This insolubilization may be the result of a cross-linking reaction or a loss of formaldehyde resulting in regeneration of polypyrrolidone. Thus, polypyrrolidone can readily be converted to a water-soluble derivative, applied from solution, and then converted into an insoluble form.

The invention is further illustrated, but not limited, by the following examples:

Example I

In a 500 ml. three-necked flask fitted with stirrer, condenser, and thermometer, 10.0 g. (0.117 unit mole) of polypyrrolidone (relative viscosity 4.95) was dissolved in 60 ml. of 70% glycolic acid by warming to 55–60° C. with stirring. A solution of 2.64 g. (0.088 mole) of paraformaldehyde in 6 ml. of water, prepared by warming in the presence of a trace of sodium hydroxide, was added and the temperature maintained at 55–60° C. for one-half hour. After diluting with 250 ml. of water and allowing to stir at 20–25° C. for fifteen minutes, the reaction mixture was filtered to remove a trace of insoluble material. The filtrate was further diluted with 250 ml. of water and then neutralized by adding 2.5 N sodium hydroxide (265 ml.) with good stirring and cooling. After stirring for one hour and storing overnight at room temperature, the product, which separated as tiny, white granules, was collected, washed well with cold water, and dried at 70° C.; weight, 9.0 g.

This modified polyamide was completely soluble in ten volumes of boiling water; on cooling, the solution formed a heat-reversible gel. The product was also soluble in aqueous alcohol but insoluble in the common anhydrous organic solvents.

Example II

An identical procedure to that described in Example I was followed except that 60 ml. of 85% lactic acid was used in place of glycolic acid as a solvent and catalyst for the reaction. On neutralization, the product separated as soft, sticky clumps which rapidly hardened on stirring; weight 9.6 g. This product showed moderate water-solubility.

Example III

Following a procedure similar to that described in Example I, a solution of 0.88 g. of paraformaldehyde in 2 ml. of water was added to 10 g. of polypyrrolidone (relative viscosity 4.95) in 60 ml. of 70% glycolic acid at 60° C. After one-half hour at 55–60° C., the reaction mixture was diluted with 500 ml. of water and neutralized and worked up as before; weight, 10.3 g. This product showed partial soluibility in boiling water.

Example IV

A procedure identical to that described in Example I was followed except that the amount of paraformaldehyde used was 7.0 g. dissolved in 10 ml. of water. The yield was in excess of 7.0 g. This highly substituted product formed a clear, viscous solution in five volumes of hot water; a 10% solution was considerably slower to gel on cooling than less highly substituted products. A thin film was cast by allowing the solvent to evaporate from a 10% aqueous solution in a Petri dish in an oven at 55–60° C. A flexible, transparent film resulted which could be cold-drawn to give an extremely tough, somewhat elastic film. The film was completely soluble in hot water.

Example V

A procedure identical to that described in Example I was followed except that, in place of paraformaldehyde, 5.0 ml. of 37% formaldehyde solution (formalin) was employed. The yield was 9.9 g.

A 2% aqueous solution (hot) of this product was applied to cotton cloth by padding to give 100% wet pickup. After drying at 110° C. for one hour, the fabric was washed in 0.5% soap solution at 60° C. for ten minutes. Quantitative procedures indicated that 85% of the finish remained on the cloth through this treatment. Application to nylon fabric in the same manner showed similar permanence to washing.

Example VI

Following a procedure similar to that described in Example I, the paraformaldehyde solution was added to 10.0 g. of polypyrrolidone (relative viscosity 2.51) and allowed to react as before. After diluting with 250 ml. of water and filtering as before, the reaction mixture was further diluted with only 50 ml. of water and then neutralized. The white, finely-granular product amounted to 10.1 g.

Example VII

A procedure identical to that described in Example VI was followed except that polypyrrolidone of relative viscosity 1.64 was used. The methylol polypyrrolidone obtained (8.8 g.) was readily soluble in five volumes of hot water.

Example VIII

Using formic acid (87–90%) in place of glycolic acid, a procedure identical to that described in Example I was followed. The product obtained showed no appreciable water-solubility.

Example IX

To a solution of 1.0 g. of polypyrrolidone (relative viscosity 9.03) in 8 ml. of 70% glycolic acid at 60° C., a solution of 0.70 g. of paraformaldehyde in 1.2 ml. of water was added with stirring and the temperature maintained at 60±2° C. for one-half hour. After cooling, diluting with 30 ml. of water, and filtering to clarify the solution, the reaction mixture was neutralized and the product collected by filtration. Evaporation of the solvent from a solution of this material in 10 ml. of hot water in a Petri dish afforded a tough, flexible film.

Example X

This example is illustrative of an alternative procedure according to the invention, wherein the formaldehyde is first dissolved in acid and the polypyrrolidone added thereto. Such a procedure permits a lower concentration of water and, therefore, a greater degree of substitution.

In a 500 ml. three-necked flask fitted with stirrer, condenser, and thermometer, 7.0 g. of paraformaldehyde was dissolved in 70 ml. of 70% glycolic acid by heating. To this solution at 60° C., 10.0 g. of finely-ground polypyrrolidone (relative viscosity 4.95) was added with stirring, and the temperature was maintained at 60±2° C. for one-half hour. After cooling, the reaction mixture was worked up in a manner similar to that described in Example I. This methylol derivative (9.9 g.) formed a clear, viscous solution in five volumes of hot water.

It will be appreciated that various modifications may be made in the invention as illustrated by the foregoing examples and as otherwise described above without departing from the scope and spirit of the invention as defined in the appended claims.

I claim:

1. Water-soluble N-methylol derivatives of polypyrrolidone.

2. N-methylol derivatives of polypyrrolidone in the form of water-soluble films.

3. A process for producing water-soluble N-methylol derivatives of polypyrrolidone which comprises reacting polypyrrolidone with formaldehyde in the presence of a monohydroxycarboxylic acid selected from the group consisting of glycolic and lactic acids.

4. The process of claim 3 wherein the reaction is carried out at between 50 and 75° C.

5. The process of claim 3, wherein the polypyrrolidone has a relative viscosity of between 1.64 and 9.03.

6. The process of claim 3, wherein the polypyrrolidone is reached with from 0.125 to 5 moles of formaldehyde per unit mole of polypyrrolidone.

7. A process for producing water-soluble N-methylol derivatives of polypyrrolidone which comprises dissolving polypyrrolidone in an aqueous solution of a monohydroxycarboxylic acid selected from the group consisting of glycolic and lactic acids and reacting said polypyrrolidone with formaldehyde by adding the latter to said polypyrrolidone solution.

8. The process of claim 7 wherein the formaldehyde is added to the polypyrrolidone solution as an aqueous solution of paraformaldehyde.

9. A process for producing water-soluble N-methylol derivatives of polypyrrolidone which comprises dissolving polypyrrolidone in an aqueous solution of a monohydroxycarboxylic acid selected from the group consisting of glycolic and lactic acids and heated to a temperature between 50 and 75° C., thereafter adding from 0.125 to 5 moles or formaldehyde per unit mole of polypyrrolidone to said solution, maintaining the temperature of said solution at between 50 and 75° C. and thereafter recovering from the reaction mixture the N-methylol derivatives of polypyrrolidone formed.

10. A processs for producing water-soluble N-methylol derivatives of polypyrrolidone which comprises dissolving formaldehyde in an aqueous solution of a monohydroxycarboxylic acid selected from the group consisting of glycolic and lactic acids and reacting said formaldehyde with polypyrrolidone by adding the latter to said formaldehyde solution.

11. A process for imparting a substantially permanent finish to textile fabric which comprises impregnating said fabric with an aqueous solution of an N-methylol derivative of polypyrrolidone and thereafter drying the impregnated fabric to insolubilize said N-methylol derivative.

12. Textile fabrics having a substantially permanent finish obtained by the process of claim 11.

References Cited in the file of this patent

UNITED STATES PATENTS

| | | |
|---|---|---|
| 2,288,279 | Hopff | June 30, 1942 |
| 2,430,866 | Foster | Nov. 18, 1947 |
| 2,638,463 | Ney | May 12, 1953 |

FOREIGN PATENTS

| | | |
|---|---|---|
| 594,075 | Great Britain | Nov. 3, 1947 |
| 879,697 | France | Nov. 30, 1942 |
| 951,510 | France | Apr. 18, 1949 |